June 20, 1944.  V. DEBS  2,351,931
DEVICE FOR THE THREE-DIMENSIONAL REPRESENTATION
OF BUILDINGS AND OTHER PHYSICAL OBJECTS
Filed May 8, 1942  2 Sheets-Sheet 1

INVENTOR.
Victor Debs
BY
Louis B. Appleba
ATTORNEY

June 20, 1944.  V. DEBS  2,351,931
DEVICE FOR THE THREE-DIMENSIONAL REPRESENTATION
OF BUILDINGS AND OTHER PHYSICAL OBJECTS
Filed May 8, 1942   2 Sheets-Sheet 2
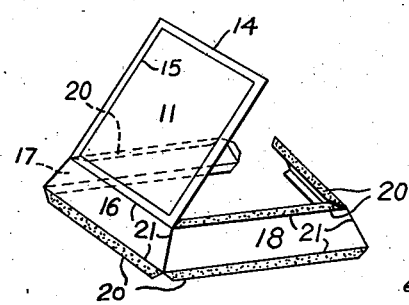
FIG.4.
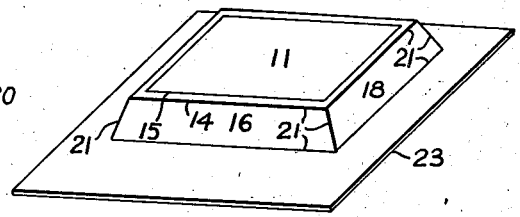
FIG.5.
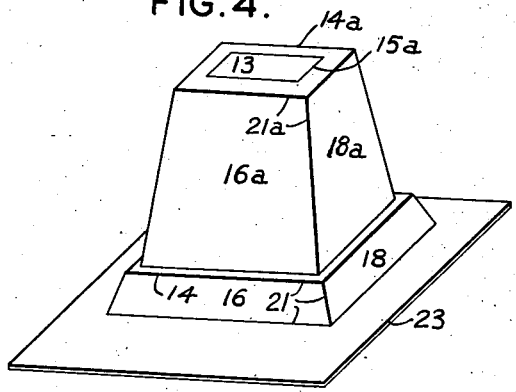
FIG.6.
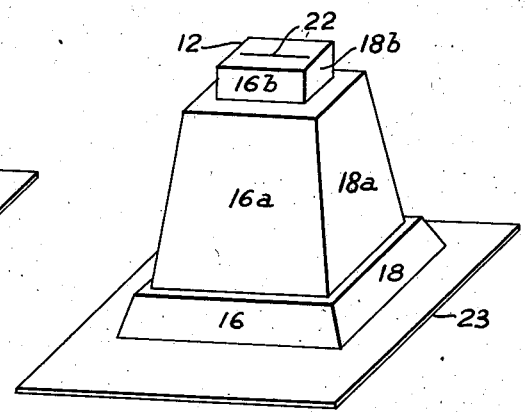
FIG.7.
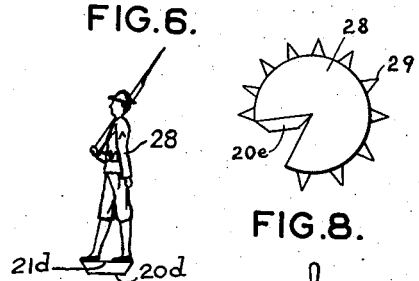
FIG.8.   FIG.9.
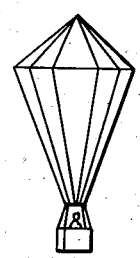
FIG.10.
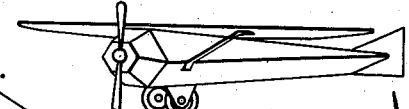
FIG.11.
FIG.12.
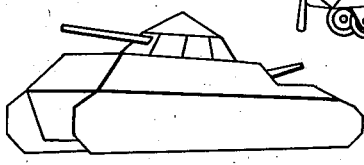
FIG.13.
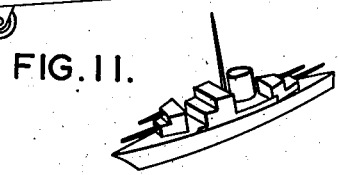
FIG.14.
INVENTOR.
*Victor Debs*
BY
*Louis B. Applebaum*
ATTORNEY Patented June 20, 1944

2,351,931

UNITED STATES PATENT OFFICE 2,351,931

DEVICE FOR THE THREE-DIMENSIONAL REPRESENTATION OF BUILDINGS AND OTHER PHYSICAL OBJECTS

Victor Debs, New York, N. Y.

Application May 8, 1942, Serial No. 442,780

4 Claims. (Cl. 46—30)

My invention relates generally to devices for the three-dimensional representation of buildings and other physical objects, and the primary object of my invention is the provision of a means for accurately depicting such objects in paper and similar media, in lieu of metal and other materials now generally unavailable.

A further object of my invention is to provide a device for the representation of buildings and other physical objects in which actual three-dimensional proportions may be visually presented.

Another object is to provide a construction set for the making of three-dimensional models of buildings and other physical objects in which the parts are simple, durable, of comparatively inexpensive cost in manufacture, and which may be assembled with facility.

A further object is to provide the component parts of the three-dimensional representation of buildings and other physical objects upon a plane surface, which may be conveniently cut and folded into forms and assembled to represent objects in their true height, width and depth, to a suitable reduced scale.

Another object is to provide members on a plane surface which may be folded to present a three-dimensional representation of a solid object of regular or irregular contour and shape.

Another object is to provide members on a plane surface which will constitute a toy which may be constructed into the shape of a toy building or other object which is a proportionate representation, in three dimensions, of a building or other object.

Another object is to provide a toy construction set for the representation in three-dimensional view of well known architectural and structural designs.

Another object is to provide a toy construction set which will be entertaining and educational, and which will stimulate the constructive faculties.

Another object is to provide a construction and assembly set for the miniature scale representation of human figures and other physical objects.

With these and other objects in view, my invention consists in the construction, arrangement and combination of the various parts whereby the objects contemplated are attained, as hereinafter more fully set forth, pointed out in my claims, and illustrated in the accompanying drawings, in which:

Figure 3:
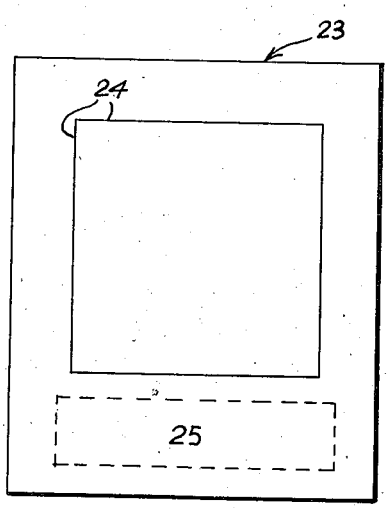

Figure 3 has a face view of the floor or base section of said embodiment;

Figure 4 is a perspective view of a section of said embodiment, showing the manner in which it is folded;

Figure 5 is a perspective view of the section of said embodiment shown in Figure 4 and the base member thereof at a subsequent step in its assembly;

Figure 6 is a perspective view of the section of said embodiment shown in Figure 5 and the adjacent member of the embodiment at a later step in its assembly;

Figure 7 is a perspective view of the embodiment of Figure 6 at a later step in its assembly;

Figure 8 is a face view of a blank constructed in accordance with my invention;

Figure 9 is a perspective view of the blank shown in Figure 8 after its assembly;

Figure 10 is a face view of a miniature scale representation of a figure made in accordance with my invention; and Figures 11, 12, 13 and 14 are perspective views of alternative embodiments of my invention.

The reference numeral 10 indicates a flat blank, made of any material which is semi-rigid and which may be cut and folded, but preferably of a material which may, conveniently, also be marked and scored. Upon the face of the blank 10, in any desired arrangement and disposition, there are marked certain areas which include the squares 11, 12 and 13 which, in combination, when cut, folded and assembled as hereinafter described, will form an object of the desired contour, shape and size.

Upon the respective planar faces each such area will include after the respective members are assembled, suitable detail (not shown) may be illustrated. To facilitate assembly, each circumferential line of each area may be marked, cut or scored, and each line marking the limits of a plane may be similarly marked or scored.

To further facilitate assembly and to provide units which may be readily constructed, selected planes are provided with integral flaps or strips, which may have any suitable adhesive means on their respective surfaces, at selected edges of those planes which are not, in the area, contiguous to other planes.

Where an object to be constructed contains a member of a geometric shape which cannot be readily analyzed into elemental geometric shapes of sizes convenient for manipulation and assembly, such portion may be delineated by two-dimensional representation.

Having described the essence of my invention, its constituent members and the method of assembling them will be better understood by reference to the specific embodiments thereof which are illustrated in the drawings.

Figure 1:
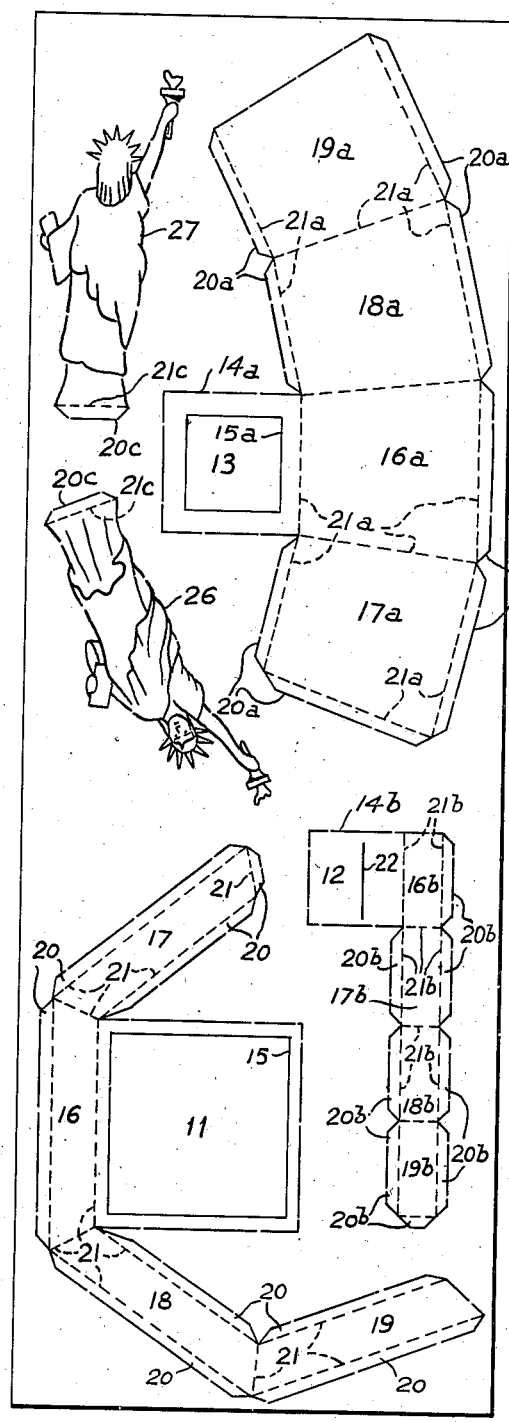
Figure 1 is a face view of a flat blank containing the component delineations and members of one embodiment of my invention.
Figure 2:
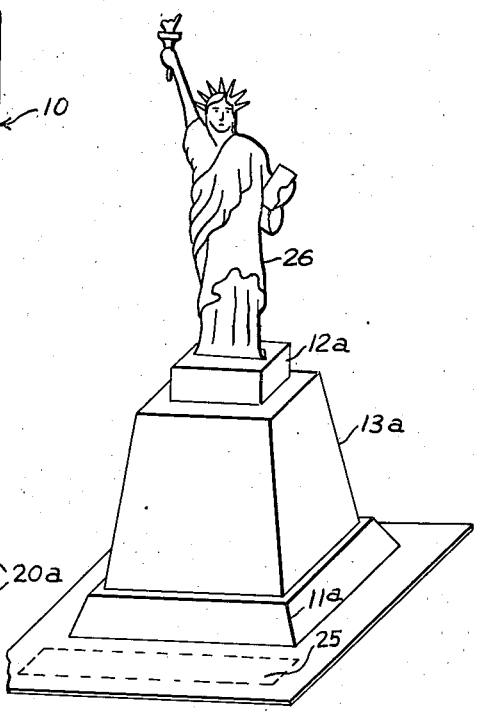
Figure 2 is a perspective view of the said embodiment assembled.

In constructing the embodiment of my invention shown in perspective in Figure 2, the square 11 of the truncated pyramid 11a comprises a square face 14, see Figs. 4 and 5, having a square 15 marked off on its surface to indicate the position of the member to be superposed. Contiguous to and integral with one side of the square face 14, a trapezoid 16, having an upper base common and coextensive with the said side of the square, and of other desired dimensions, is described. Adjacent opposite sides of the trapezoid 16, are marked the equivalent trapezoids 17 and 18, each having a common and coextensive side with the trapezoid 16, and adjacent either the trapezoid 17 or 18, is marked an equivalent trapezoid 19, having a common and coextensive side therewith, that is, connected serially therewith and shown of diminishing dimensions. Upon the upper and lower bases of said trapezoids, and upon the free and open side of either the trapezoid 17 or the trapezoid 19, integral flaps or strips 20 are provided. Said flaps or strips may also be provided with any suitable adhesive means, such as glue, etc.

The periphery of the square 11 may be marked, cut or scored, and the fold lines 21, positioned at every non-peripheral edge of a planar surface, may be marked or scored to facilitate assembly.

The square 13 being also a truncated pyramid, is constructed in the same manner as the projection 11; in the drawings, corresponding numerals, with the exponent "a" added, refer to the corresponding parts.

The section 12, being a rectangular parallelopiped, is likewise constructed in similar manner. In such a geometric figure, of course, the wall members will be rectangular, in lieu of the trapezoidal wall members of the squares 11 and 13. In this square, corresponding numerals, with the exponent "b" added, refer to corresponding parts.

To insert the figure hereinafter described, the face of the square 12 may be marked, scored or cut at the center line 22 for an appropriate distance.

The figure shown in the assembled object illustrated in Figure 2, being of a contour and shape not readily reducible to geometric units of a size which can be conveniently manipulated, may be made in a two-dimensional representation. The face view 26 and the rear view 27, each marked, cut or scored on their respective peripheral lines, are made in equivalent desired contour, preferably with appropriate markings of the detail of the figure represented. Integral with and at the base of each such view, flaps or strips 20c, constructed in the manner hereinbefore described, and provided, optionally, with suitable adhesive material, are positioned.

For mounting and assembly of the geometric elements and other parts, a floor or base 23 is provided. Said base 23 has an appropriate portion 24 marked off for positioning the member to be placed or affixed adjacent thereto. Further, said base may be provided with suitable written matter 25 describing the object, or may be provided with other decorative detail (not shown).

In assembling the units, the several parts 11, 12, 13, 26 and 27 are removed from the flat blank 10. This step, of course, will be facilitated when the peripheral lines of said parts are marked or scored. The part containing the square 11 is then folded along the indicated fold lines 21, as shown in Figure 4, and when the appropriate strips or flaps 20 are adhered to the face 14, and to each other, it is secured to the base 23, upon the marked off portion 24, by means of the appropriate strips or flaps 20, as shown in Figure 5. In like manner, the parts containing the squares 13 and 12 are successively assembled into the geometric figures planned and are successively affixed to the indicated portions of the object and each other, as shown in Figures 6 and 7. Thereafter, and in like manner, the figures 26 and 27 are folded on the indicated fold lines and secured to each other, and their respective strips or flaps 20c are affixed to the object on the line 22 thereof to complete the object.

As shown in Figures 8 and 9, where it is desired to provide a curved surface, such as the cone thereby illustrated, the appropriate outlined area 28 is described, and a series of strips or flaps 29 positioned peripherally thereon. As hereinbefore described, said area is also provided with a strip or flap 20e, which may have suitable adhesive means for retaining the said object in the planned and assembled shape.

As shown in Figure 10, any desired miniature representation, which may, alternatively, contain desired detail on its face 28 and on its rear surface (not shown), may be affixed to objects made in accordance with my invention. Such miniature representation is provided with a strip or flap 20d, and an indicated fold line 21d, as hereinbefore described.

It will be apparent from the perspective views of Figures 11, 12, 13 and 14 that an object of any desired shape may be constructed in accordance with my invention. From such views, the component geometric figures will be apparent, and outlined areas thereof, well known, may readily be constructed.

Having thus described my invention, what I claim and desire to secure by Letters Patent is:

1. In pedestal structure, a plurality of individual pedestal parts separately formed of foldable sheet material and superimposed one upon another, each of said pedestal parts being folded into final form from a sheet blank which includes a platform panel and a series of interconnected lateral wall panels, the said platform panel being connected to an end of one of the lateral wall panels of said series, a securing flap extending from and along the opposite end of said one wall panel, and respective securing flaps extending from and along corresponding ends of the remaining lateral wall panels of said series, the said blank being cut and scored so that the respective panels and securing flaps thereof fold relative to each other in the forming of the said pedestal parts; and means securing the securing flaps of an upper pedestal part to the platform panel of a lower pedestal part, the platform panel of the topmost pedestal part being adapted to receive a representation for display.

2. Structure as recited in claim 1 wherein the securing flaps are glue-flaps, and wherein the securing means is adhesive.

3. A toy, comprising a sheet of cut-outs including representations of the component panel parts of several three-dimensional geometric figures of differing characteristics, the component panel parts of each figure comprising a platform panel and a series of interconnected lateral wall panels, the said platform being connected to an end of one of the lateral wall panels of said series; a securing flap extending from and along the opposite end of said one lateral wall panel; and respective securing flaps extending from and along corresponding ends of the remaining lateral wall panels of said series, the said component panel parts of the respective geometric figures being foldable relative to each other to form a plurality of pedestal parts, adapted for superimposition, one upon another, in the forming of a three-dimensional pedestal, the platform panel of a lower pedestal part of which serves to receive and secure the securing flaps of the next upper pedestal part, and the platform panel of the topmost pedestal part being adapted to receive a representation for display.

4. A toy as recited in claim 3 wherein the securing flaps are glue-flaps, and wherein the platform panel of a lower pedestal part serves to adherently receive and secure the glue-flaps of the next upper pedestal part.

VICTOR DEBS.